United States Patent [19]
Balow

[11] Patent Number: 5,590,597
[45] Date of Patent: Jan. 7, 1997

[54] TAPERED BEARING HOUSING SLEEVES

[75] Inventor: Frank A. Balow, Western Springs, Ill.

[73] Assignee: Rockwell International Corporation, Seal Beach, Calif.

[21] Appl. No.: 525,878

[22] Filed: Sep. 8, 1995

[51] Int. Cl.$^6$ .............................. B41F 13/20; B41F 13/28
[52] U.S. Cl. ............................................ 101/216; 101/485
[58] Field of Search ..................................... 101/216, 217, 101/218, 247, 184, 185, 483, 485; 384/255, 256, 58, 57, 96

[56] References Cited

U.S. PATENT DOCUMENTS

| | | | |
|---|---|---|---|
| 3,605,617 | 9/1971 | Wieland | 101/218 |
| 4,509,425 | 9/1985 | Hahn et al. | 101/216 |
| 4,913,048 | 4/1990 | Tittgemeyer | 101/375 |

FOREIGN PATENT DOCUMENTS

| | | | |
|---|---|---|---|
| 3635569 | 7/1987 | Germany | 101/247 |

*Primary Examiner*—J. Reed Fisher
*Attorney, Agent, or Firm*—C. B. Patti; G. A. Montanye

[57] ABSTRACT

A mounting apparatus for a printing cylinder in a printing press is provided. The apparatus includes a tapered bearing housing sleeve 12 adapted for axial insertion into, and retraction out of, a tapered bore 30 formed in a support frame 20 for the printing cylinder. The tapered bearing housing sleeve 12 has an outer circumferential surface 26 which is generally conically shaped forming only part of a cone and an inner core which has a cylindrically shaped bore 34 disposed therein. The tapered bearing housing sleeve 12 has an end with a flanged tip 32 for limiting the axial movement of the tapered housing sleeve within the tapered bore 30. The mounting apparatus further includes a generally annular-shaped bearing 14 which is disposed within the cylindrically shaped bore 34 of the tapered bearing housing sleeve 12. The generally annular-shaped bearing 14 is defined by an inner ring 38 and an outer ring 40 and a plurality of anti-friction elements 42 disposed between the inner ring and the outer ring.

11 Claims, 2 Drawing Sheets

TAPERED BEARING HOUSING SLEEVES

FIELD OF THE INVENTION

This invention relates generally to printing cylinders in offset printing presses and more particularly to an improved bearing housing sleeve and frame bore for a printing cylinder in an offset printing press.

BACKGROUND OF THE INVENTION

Typical offset lithographic printing presses comprise five basic components: a web feed, a printing unit or units, a dryer, a chill roll unit and a folder. The printing press has one or more printing units depending upon the number of colors which are needed for the particular printing task. A separate printing unit is needed for each color. A typical newspaper press only has one printing unit for the color black. A full color printing press may have either four or five printing units depending upon whether or not a special color is used. The three primary printing colors are yellow, cyan and magenta.

Each printing unit comprises a plate cylinder having a printing plate mounted on its outer circumferential surface, a blanket cylinder having a printing blanket mounted on its outer circumferential surface, an inking system and a dampening system. The inking system includes a plurality of rollers which transfer ink from an ink reservoir to the surface of the printing plate. The dampening system also includes a plurality of rollers which transfer dampening solution from a dampening reservoir to the surface of the printing plate. The dampening solution is provided to facilitate the transfer of the ink from the printing plate onto the surface to be printed, which is typically paper. The plate cylinder rotates in contact with the blanket cylinder. The image from the printing plate is therefore transferred from the surface of the printing plate to the surface of the printing blanket which in turn transfers the image to the paper. This type of printing, known as offset printing, is an indirect printing process because the printed image is first transferred to a printing blanket before it is printed on the paper. In direct printing processes, such as in most intaglio and flexographic printing techniques, the printed image is transferred directly from the printing plate to the paper.

A web feed feeds paper through each of the printing units in an offset lithographic printing press. The paper is fed in a web form, i.e., one continuous sheet. A web is usually anywhere between 18.0 inches and 80.0 inches wide. Typically, up to eight pages can be printed across the width of the web. The web passes between a pair of impression cylinders as it passes through each printing unit. At least one of the pair of impression cylinders is a blanket cylinder. To achieve double-sided printing, both of the impression cylinders are blanket cylinders, i.e., one blanket cylinder is mounted on one side of the web and the other is mounted on the other side of the web. Each blanket cylinder has a corresponding plate cylinder and inking and dampening system. Thus, a printing unit which can print on both sides of the web has two printing sections. Different images can therefore be printed on the opposite sides of the web. The diameters of the blanket cylinders may be the same size as the plate cylinders, or they may be some multiple thereof, i.e., 2 or 3 times the size.

Each plate cylinder and blanket cylinder, generically referred to as a printing cylinder, is mounted between two side flames of the printing unit. Each side frame has a pair of cylindrical bores into which the shafts of the adjacent cylinders fit. A cylindrical bearing housing sleeve is provided which is disposed between the shaft of each cylinder and the corresponding cylindrical bore in the frame. Anti-friction bearings are also provided between the cylindrical bearing housing sleeve and the shaft of the cylinder. The print quality, in part, depends on how well the bearing housing sleeves fit into the cylindrical bores in the frame. Typically, the closer the fit, the better the print quality. However, the fit must also be free to a certain extent to allow for thermal expansion of the bearing housing sleeves as they heat up during operation of the printing press. The fit must also be free to a certain extent to provide a rotational clearance so that adjacent printing cylinders can be moved into or out of contact with ("thrown-off") one another. It is often necessary to "throw-off" the printing cylinders so that the surfaces of the cylinders can be cleaned or the printing plate or printing blanket can be changed. The printing cylinders are typically not separated from one another more than between 0.0625 to 0.125 inches when they are in the "thrown-off" position.

A drawback with prior art bearing housing sleeves is that their fit within the corresponding frame bores cannot be adjusted to obtain a close fit. Excessive "play" exists to allow for thermal expansion of the bearing housing sleeves so that they do not get stuck in the frame bores and thus prevent the printing cylinders from being moved out of contact with one another for servicing. As a result of this excessive "play," print quality suffers.

One solution has been to place a tapered anti-friction bearing in the space between the bearing housing sleeve and the frame bore. By axially adjusting the position of the tapered anti-friction bearing, the "fit" between the bearing housing sleeve and the frame bore can be adjusted. During operation, the tapered anti-friction bearing can be adjusted so that a close fit between the bearing housing sleeve and the frame bore can be obtained. By achieving a close fit between the bearing housing sleeve and the frame bore, a constant pressure can be maintained between the printing cylinders which is an important operating condition necessary for obtaining a high quality printed image. The tapered bearing may also be adjusted to loosen the "fit" between the bearing housing sleeve and the frame bore so that the printing cylinders can be thrown-off from one another. This is typically achieved by rotating bearing housing sleeves of at least one of the printing cylinders which are eccentric. As eccentric bearing housing sleeves are rotated, the cylinder mounted in these eccentric bearing housing sleeves moves laterally away from the adjacent printing cylinder. A drawback of this solution, however, is that use of the tapered bearings takes more space, makes for a more complicated design, and requires additional parts and thus increases the cost of manufacturing the printing press.

The present invention is directed to overcoming, or at least minimizing, some of these problems.

SUMMARY OF THE INVENTION

In accordance with one aspect of the present invention, a tapered bearing housing sleeve adapted for insertion into a tapered bore formed in a support frame of a printing press is provided. The tapered bearing housing sleeve has an outer circumferential surface which is generally conically shaped, forming only part of a cone, and an inner core. A cylindrically shaped bore is disposed within the inner core. In one embodiment, the cone defining the outer circumferential surface of the bearing housing sleeve and the cylinder defining the bore are eccentric. In another embodiment, the cone defining the outer circumferential surface of the bearing housing sleeve and the cylinder defining the bore are concentric. The tapered bearing housing sleeve can be axially inserted into, or retracted out of, the tapered bore making its fit within the tapered bore adjustable. The fit can be made tighter during operation of the printing press so that a constant pressure between the printing cylinders can be maintained, or it can be made looser, so that the tapered bearing housing sleeve can be rotated to either throw-off the printing cylinders or engage them. Axial movement of the tapered housing sleeve within the tapered bore is limited by a flange which is provided on one end of the tapered bearing housing sleeve.

A generally annular-shaped bearing is also provided. It is disposed within the cylindrically-shaped bore of the tapered bearing housing sleeve. The generally annular-shaped bearing is defined by an inner ring and an outer ring and a plurality of anti-friction elements disposed between the inner ring and the outer ring.

In accordance with another aspect of the present invention, a method for maintaining a constant pressure between adjacent printing cylinders in a printing press is provided. The method includes the step of closely fitting tapered bearing housing sleeves within associated tapered bores in the support frame of the printing press. The outer circumferential surface of the tapered housing bearing sleeve conforms to the tapered shape of the bore in the support frame. The step of closely fitting each tapered bearing housing sleeve within a corresponding tapered bore within the support frame entails axially inserting the tapered bearing housing sleeve within the tapered bore.

In accordance with yet another aspect of the present invention, a method of disengaging the printing cylinders in a printing press is provided. The method includes the step of axially retracting the eccentric bearing housing sleeves of at least one of the printing cylinders partially out of the associated tapered bores in the support frame. The outer circumferential surface of the housing bearing sleeve is tapered so as to conform to the tapered shape of the bore in the support frame. The eccentric bearing housing sleeves are then rotated so as to cause the printing cylinder mounted within the sleeves to move away from the adjacent printing cylinder.

BRIEF DESCRIPTION OF THE DRAWINGS

Other aspects and advantages of the present invention will become apparent upon reading the following detailed description and upon reference to the drawings in which.

DETAILED DESCRIPTION OF THE PREFERRED EMBODIMENTS

Figure 1:
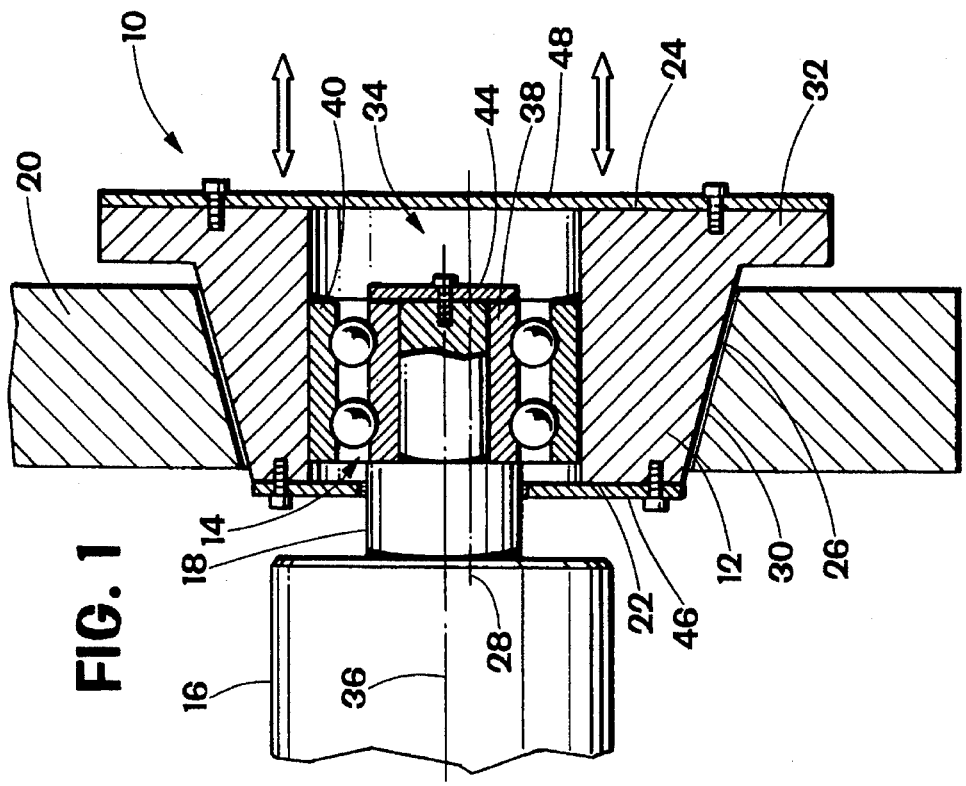
FIG. 1 is a side view of a tapered bearing housing sleeve and associated tapered support frame bore according to the present invention.

Turning now to the drawings and referring initially to FIG. 1, a printing cylinder mounting apparatus according to the present invention is shown generally by reference numeral 10. The printing cylinder mounting apparatus 10 includes a bearing housing sleeve 12 and a bearing 14 and is used in mounting a printing cylinder 16 having a shaft 18 to a support frame 20 of a printing unit. The bearing housing sleeve 12 is generally conical in shape having a convergent end 22 and a divergent end 24. The bearing housing sleeve 12 has a tapered outer circumferential surface 26 which converges from the divergent end 24 to the convergent end 22. The tapered outer circumferential surface 26 converges toward a centerline 28. However, the bearing housing sleeve 12 forms only part of a cone so that the outer circumferential surface 26 does not actually converge at the centerline 28. Rather, it terminates short of said centerline.

The bearing housing sleeve 12 is axially mounted within the support frame 20 of the printing unit. It fits within, and is axially movable relative to, a tapered bore 30. The bore 30 converges from the outside region of the printing unit, defined as the region to the right of the support frame 20, as shown in FIG. 1, to the inside region of the printing unit, defined as the region to the left of the support frame, as shown in FIG. 1. Like the outer circumferential surface 26 of the bearing housing sleeve, the bore 30 converges toward the centerline 28, but does not actually converge at the centerline 28. It terminates short of said centerline.

The divergent end 24 of the bearing housing sleeve 12 has a flanged tip 32 which limits the inward axial movement of the bearing housing sleeve within the tapered bore 30.

The bearing housing sleeve 12 has a bore 34 having a centerline 36 which is disposed within its inner surface. In the embodiment shown in FIG. 1, the centerline 36 is not coaxial with the centerline 28. The bearing housing sleeve 12 is therefore defined as being eccentric. This is illustrated in the side cross-sectional view of the bearing housing sleeve shown in FIG. 1 which shows the upper portion of the bearing housing sleeve 12 as being narrower than the lower portion. This can also be seen in FIG. 2. This eccentric arrangement is used to throw-off the printing cylinders. As the eccentric bearing housing sleeve 12 is rotated about its axis, centerline 28, the bore 34 housing the shaft 18, revolves about the centerline 28. This motion causes the cylinder 16 to rotate away from the adjacent printing cylinder (not shown), thus placing the cylinders in a thrown-off position. Typically, a quarter revolution of the bearing housing sleeve 12 translates into a separation of the printing cylinders by approximately between 0.0625 and 0.125 inches.

Figure 3:
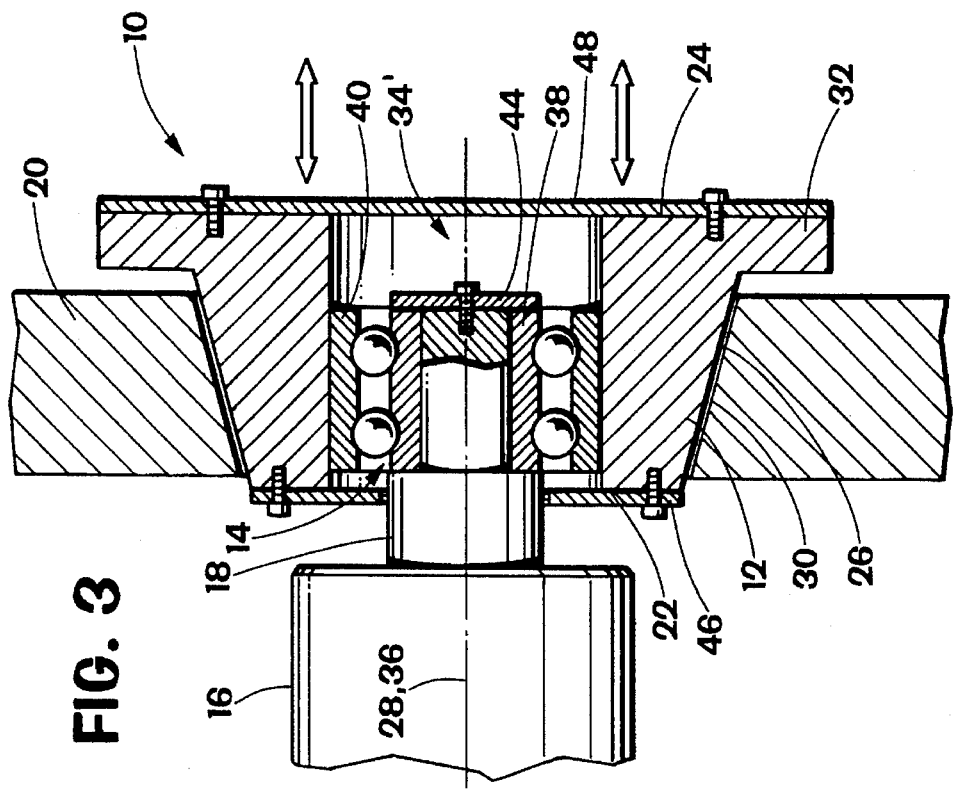
FIG. 3 is a side view of another embodiment of a tapered bearing housing sleeve and associated tapered support frame bore according to the present invention.

In an alternate embodiment, the bore 34 is disposed in the center of the bearing housing sleeve 12, i.e., it is concentric with the outer circumferential surface 26 of the bearing housing sleeve, as shown in FIG. 3. In this embodiment, the centerline 36 is coaxial with the centerline 28. Only one of the cylinders in the plate cylinder/blanket cylinder pair need be mounted in bearing housing sleeves 12 which have eccentric bores 34 to place the cylinders in a thrown-off position. The other of the pair can have bearing housing sleeves 12 which have concentric bores 34', as shown in FIG. 3.

The bearing housing sleeve 12 is preferably formed on a cast iron, ductile iron, steel or similar material. The outer diameter of the bearing housing sleeve 12 at the convergent end 22 is approximately 8.0 inches. The diameter of the inner bore 34 of the bearing housing sleeve 12 is approximately 5.0 inches.

Figure 2:
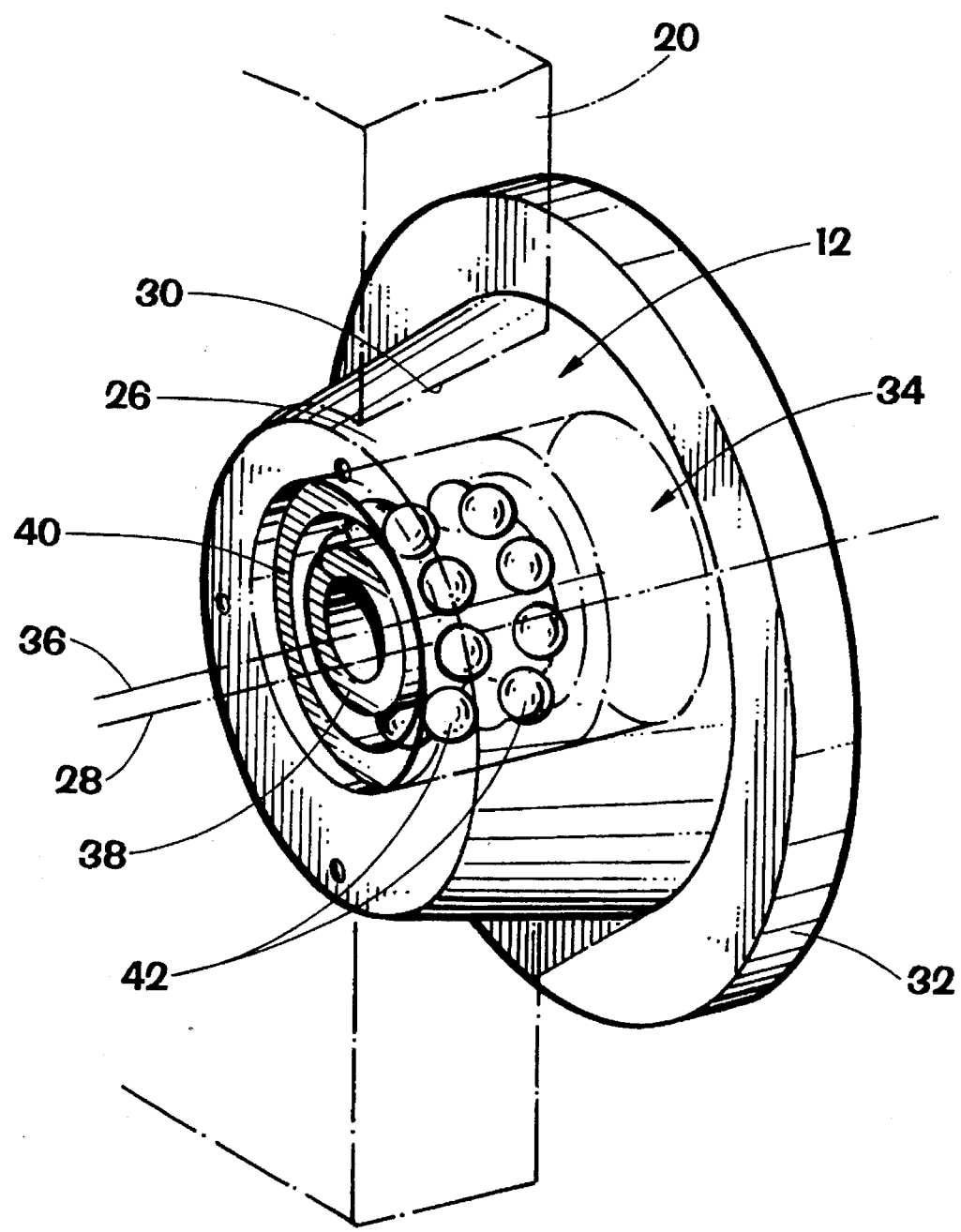
FIG. 2 is a perspective view of the tapered bearing housing sleeve and associated bearing according to the present invention.

The bearing 14 is a generally annular-shaped member which is defined by an inner ring 38, also known as an inner race, and an outer ring 40, also known as an outer race, as shown in FIG. 2. The inner ring 38 has a diameter of approximately between 3.0 and 3.5 inches and the outer ring 40 has a diameter of approximately 5.0 inches. A plurality of anti-friction rolling elements 42 are disposed between the inner ring 38 and the outer ring 40. Any anti-friction rolling elements may be used. Examples of such anti-friction rolling elements include: a tapered roller bearing, a spherical roller bearing, and a ball bearing. The anti-friction bearings 42 shown in FIGS. 1–3 are of the ball bearing type. As those of ordinary skill in the art will appreciate, other anti-friction rolling elements may also be used.

The bearing 14 supports the shaft 18 of the printing cylinder 16 within the housing bearing sleeve 12 and support frame 20, respectively. The bearing 14 in turn is disposed within the inner bore 34 of the bearing housing sleeve 12. The bearing 14 allows the printing cylinder 16 to rotate within the support frame 20. The printing cylinder 16 rotates relative to the bearing housing sleeve 12 which during the operation of the printing press remains stationary.

The printing cylinder mounting apparatus 10 further includes a locking washer 44 which couples the shaft 18 to the inner ring 38 of the bearing 14, as shown in FIGS. 1 and 3. The locking washer 44 causes the inner ring 38 of the bearing 14 to rotate with the shaft 18. The inner ring 38 and shaft 18 rotate relative to the outer ring 40 and bearing housing sleeve 12 which remain stationary during the operation of the printing press.

The bearing 14 is preferably sealed in a fluid tight chamber containing oil and/or other lubricants. The fluid tight chamber is formed by a pair of plates 46 and 48 which are attached to the convergent and divergent ends 22 and 24 of the bearing housing sleeve 12, respectively, as shown in FIGS. 1 and 3. In an alternate embodiment, the bearing 14 is greased.

The bearing housing sleeve 12 can be closely fit within the tapered bore 30 within the support frame 20 by axially inserting the bearing housing sleeve 12 into the tapered bore 30 until the desired fit is achieved. The tapered shape of the surfaces of the bore 30 and bearing housing sleeve 12 permits the bearing housing sleeve to be closely fit within the bore 30. The bearing housing sleeve 12 can also be axially retracted to loosen the fit of the bearing housing sleeve within the tapered bore 30. This is particularly advantageous for eccentric bearing housing sleeves 12 which must be rotated to throw-off the printing cylinders. Often thermal expansion causes prior art bearing housing sleeves to seize up within the bores of the support frame thus precluding the bearing housing sleeve from rotating. The tapered design of the bearing housing sleeve 12 and associated bore 30 in the support frame 20 allows the bearing housing sleeve to be loosened so that it can be rotated and thus eliminates this problem.

Those skilled in the art who now have the benefit of the present disclosure will appreciate that the present invention may take many forms and embodiments. Some embodiments have been described so as to give an understanding of the invention. It is intended that these embodiments should be illustrative, and not limiting of the present invention. Rather, it is intended that the invention cover all modifications, equivalents and alternatives falling within the spirit and scope of the invention as defined by the appended claims.

What is claimed is:

1. In a mounting apparatus for a printing cylinder in a printing press the improvement comprising: a tapered bearing housing sleeve adapted for axial insertion into, and retraction out of, a tapered bore formed in a support frame for the printing cylinder, the tapered bearing housing sleeve having an outer circumferential surface that is generally conically shaped forming only part of a cone and an inner core that has a cylindrically shaped bore disposed therein, wherein the cone defining the outer circumferential surface of the bearing housing sleeve and the cylinder defining the bore are eccentric.

2. The mounting apparatus according to claim 1, wherein the tapered bearing housing sleeve has an end with a flanged tip for limiting the axial movement of the tapered housing sleeve within the tapered bore.

3. The mounting apparatus according to claim 1, further comprising a generally annular-shaped bearing which is disposed within the cylindrically shaped bore of the tapered bearing housing sleeve.

4. The mounting apparatus according to claim 3, wherein the generally annular-shaped bearing is defined by an inner ring and an outer ring and a plurality of anti-friction elements disposed between the inner ring and the outer ring.

5. A mounting apparatus for a printing cylinder in a printing press, comprising:

a tapered bearing housing sleeve having an outer circumferential surface which is generally conically shaped forming only part of a cone and an inner core which has a cylindrically shaped bore disposed therein, a generally annular-shaped bearing disposed within the tapered bearing housing sleeve; and wherein the cone defining the outer circumferential surface of the tapered bearing housing sleeve and the cylinder defining the bore are eccentric.

6. The mounting apparatus according to claim 5, wherein the tapered bearing housing sleeve has an end with a flanged tip for limiting the axial movement of the tapered housing sleeve within the tapered bore.

7. The mounting apparatus according to claim 5, wherein the generally annular-shaped bearing is defined by an inner ring and an outer ring and a plurality of anti-friction elements disposed between the inner ring and the outer ring.

8. In a method for maintaining a constant pressure between adjacent printing cylinders in a printing press having a support frame and bearing housing sleeves in which the shafts of the printing cylinders are mounted, the improvement comprising the step of closely fitting each bearing housing sleeve within an associated tapered bore in the support frame, said bearing housing sleeves having a tapered outer circumferential surface which conforms to the tapered shaped of the bore in the support frame and an inner core that has a cylindrically shaped bore disposed therein, wherein the cone defining the outer circumferential surface of the bearing housing sleeve and the cylinder defining the bore are eccentric.

9. The method according to claim 8, wherein the step of closely fitting each tapered bearing housing sleeve within a corresponding tapered bore within the support frame entails axially inserting the tapered bearing housing sleeve within the tapered bore.

10. In a method for disengaging adjacent printing cylinders in a printing press having a support frame and a pair of eccentric bearing housing sleeves in which the shaft of one of the printing cylinders is mounted, the improvement comprising the step of axially retracting each eccentric bearing housing sleeve at least partially out of an associated tapered bore in the support frame, said eccentric bearing housing sleeves having a tapered outer circumferential surface which conforms to the tapered shape of the bore in the support frame.

11. The method according to claim 10, further comprising the step of rotating the tapered eccentric bearing housing sleeves so as to cause the printing cylinder mounted within said sleeves to move away from the adjacent printing cylinder.

* * * * *